(12) United States Patent
Rozenberg et al.

(10) Patent No.: US 10,877,365 B2
(45) Date of Patent: Dec. 29, 2020

(54) AERIAL PHOTOGRAPHY CAMERA SYSTEM

(71) Applicant: ISRAEL AEROSPACE INDUSTRIES LTD., Lod (IL)

(72) Inventors: Ohad Rozenberg, Yad Binyamin (IL); Haim Somech, Yavne (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 15/777,397

(22) PCT Filed: Nov. 1, 2016

(86) PCT No.: PCT/IL2016/051176
§ 371 (c)(1),
(2) Date: May 18, 2018

(87) PCT Pub. No.: WO2017/090022
PCT Pub. Date: Jun. 1, 2017

(65) Prior Publication Data
US 2018/0373136 A1    Dec. 27, 2018

(30) Foreign Application Priority Data
Nov. 26, 2015    (IL) .......................................... 242790

(51) Int. Cl.
*G03B 37/02*    (2006.01)
*G03B 19/00*    (2006.01)
(Continued)

(52) U.S. Cl.
CPC ............. *G03B 37/02* (2013.01); *B64D 47/08* (2013.01); *G01C 11/00* (2013.01); *G03B 15/006* (2013.01);
(Continued)

(58) Field of Classification Search
CPC combination set(s) only.
See application file for complete search history.

(56) References Cited

U.S. PATENT DOCUMENTS 3,690,234 A    9/1972 Costianes
5,150,150 A    9/1992 Enomoto
(Continued)

FOREIGN PATENT DOCUMENTS

DE    19937775 A1    2/2000

OTHER PUBLICATIONS

"RecceLite XR", Refael Advanced Defense Systems Ltd, http://www.rafael.co.il/5651-1038-en/Marketing.aspx, 1 page, available at least as of Mar. 29, 2015.
"Vision Map", Refael Advanced Defense Systems Ltd, http://www.visionmap.com/Airborne_Imaging_Systems/126/MIST_G, 2 pages, available at least as of Mar. 29, 2015.

*Primary Examiner* — Dave Czekaj
*Assistant Examiner* — Samuel D Fereja
(74) *Attorney, Agent, or Firm* — Dorsey & Whitney LLP

(57) ABSTRACT

The presently disclosed subject matter includes a camera system for aerial photography applications which can be mounted on an aircraft and be operated for obtaining images of a surveyed area. The proposed camera system comprises a camera control unit operatively connected to a camera supported by a pivotal supporting device such as a gimbal assembly. The camera is continuously moved along a scanning line without stopping and is operated to capture images in a certain frame rate, this is carried out by measuring as well as regulating the angular velocity of the camera to adapt the pictured and the non-pictures zones over the scanning line.

21 Claims, 5 Drawing Sheets

(51) Int. Cl.
  *G03B 15/00*  (2006.01)
  *G03B 29/00*  (2006.01)
  *G03B 37/04*  (2006.01)
  *G01C 11/00*  (2006.01)
  *B64D 47/08*  (2006.01)
  *H04N 5/232*  (2006.01)
  *G03B 17/56*  (2006.01)
  *B64C 39/02*  (2006.01)

(52) U.S. Cl.
  CPC ........... *G03B 17/561* (2013.01); *G03B 29/00* (2013.01); *G03B 37/04* (2013.01); *H04N 5/2328* (2013.01); *H04N 5/23299* (2018.08); *B64C 39/024* (2013.01); *B64C 2201/127* (2013.01)

(56) References Cited

U.S. PATENT DOCUMENTS

| | | |
|---|---|---|
| 6,128,442 A | 10/2000 | Enomoto |
| 6,487,369 B1 | 11/2002 | Sato |
| 6,864,916 B1 | 3/2005 | Naya et al. |
| 9,046,759 B1 | 6/2015 | Tarlinton et al. |
| 2004/0173726 A1 | 9/2004 | Mercadal et al. |
| 2007/0129853 A1 | 6/2007 | Greenfeld et al. |
| 2010/0312393 A1 | 12/2010 | Someya |
| 2014/0028846 A1* | 1/2014 | Krueger ............ H04N 5/23287 348/144 |
| 2014/0362177 A1 | 12/2014 | Dunn |
| 2019/0047700 A1* | 2/2019 | Liu ................... B64C 39/024 |

\* cited by examiner

AERIAL PHOTOGRAPHY CAMERA SYSTEM

FIELD OF THE PRESENTLY DISCLOSED SUBJECT MATTER

The presently disclosed subject matter relates to the field of aerial photography.

BACKGROUND

In aerial photography a camera system located at an elevated position is used for capturing photographs of the ground. Camera systems mounted onboard an aircraft (including manned aircrafts and unmanned aircrafts) are used for the purpose of imagery collection and analysis in various types of missions including, for example, terrain dominance related applications in general, and more specifically, cartography, land use and environmental conditions studies, reconnaissance, among others.

The camera system can be mounted on a special supporting device such as a gimbal assembly. A gimbal assembly can comprise one or more gimbals providing one or more degrees of freedom, respectively. The gimbals enable to move the camera about one or more spin axes and thus enable to point the camera in a desired direction. For example, a gimbal assembly comprising two gimbals provides two-degrees-of-freedom, including one spin axis which is perpendicular to the surface of the aircraft (e.g. in its direction of propulsion) and a second spin axis which is either parallel to the surface of the aircraft, or at some angle other than perpendicular.

GENERAL DESCRIPTION

As mentioned above, during aerial photography missions, a camera system, including a camera device mounted on a supporting device (such as a gimbal assembly) onboard an aircraft, is operated for capturing images of the ground below. The camera device can include an electro-optic sensor which can provide for example, color optical images, black and white optical images, as well as infra-red images or any other types of imaging systems.

FIG. 1a schematically illustrates an aircraft 200 carrying a camera system 100 which can be used in aerial photography missions. As the aircraft passes over the area of interest (i.e. the area desired to be captured by the camera) images of the ground are being captured at a certain frame rate. During operation of the camera systems, the gimbal assembly can be configured to move the camera around one or more gimbal axes to provide a scanning motion from side to side (e.g. in a sweeping motion across the flight direction) in order to increase the range which is covered by the camera. Multiple images of the ground terrain are captured to be synthetically combined into a single continuous image.

In order to obtain images with good quality characterized for example by adequate sharpness and specifically in order to avoid (or at least reduce) motion-blur resulting from the relative motion between the camera and the objects in the scene, the velocity of the camera movement is restricted.

According to one solution known in the art, camera systems used in aerial photography include mirrors designed to be moved in order to change the point of view of the camera, while the camera movement is restricted.

The presently disclosed subject matter includes a new camera system for aerial photography applications. The camera system can be mounted on an aircraft and be operated for obtaining images of a surveyed area. The proposed camera system comprises a camera control unit operatively connected to a camera supported by a pivotal supporting device such as a gimbal assembly. The supporting device (referred to herein by way of non-limiting example only also as "Gimbal assembly") is connected to the aircraft and provides the camera with mechanical support and the required degrees of freedom.

During operation of the camera systems, the camera control unit controls the operation of the gimbal assembly and the operation of the camera. According to the presently disclosed subject matter, the camera is continuously moved along the scanning line without stopping (i.e. camera movement velocity>0) and is operated to capture images in a certain frame rate. As the camera is being moved, the camera control unit is configured to adapt the camera movement velocity (i.e. the velocity at which the camera is being moved) to the current operational mode of the camera. When the camera is in a first operational mode i.e. the camera is being moved while capturing an image (referred herein also as "exposure mode"), the camera control unit is configured to maintain the camera movement velocity within one range of values; when the camera is in a second operational mode i.e. the camera is being moved and is not capturing an image (referred herein also as "non-exposure mode"), the camera control unit is configured to maintain the camera movement velocity within another range of values.

The first range of values is selected in order to avoid or at least reduce motion-blur. The second range of values is selected in order to move the camera as fast as possible to the next exposure point, such that the camera movement velocity at the next exposure point is within the first range of values.

According to an aspect of the presently disclosed subject matter there is provided a camera system for aerial photography, comprising:

a camera control unit operatively connected to a supporting device and camera; the supporting device is connected to the camera and is configured to mechanically support the camera and to move the camera in one or more spinning axes in order to achieve camera movement in a desired direction;

the camera control unit is configured to:

control the supporting device to move the camera along a scanning line; and to control the camera to capture images in a certain frame rate as the camera is being moved along the scanning line; the camera control unit is further configured to control the supporting device to adapt the velocity at which the camera is being moved according to the current operational mode of the camera; wherein when the camera is in exposure mode, the velocity is adapted to be within a first range, selected to reduce camera motion blur; and wherein when the camera is in a non-exposure mode the velocity is adapted to be within a second range which is different than the first range.

In addition to the above features, the method according to this aspect of the presently disclosed subject matter can optionally comprise one or more of features (i) to (x) below, in any desired combination or permutation:

(i). wherein the first range includes values greater than zero and equal or smaller than a maximal velocity threshold value; and wherein the camera control unit is configured to calculate the maximal velocity threshold based on an exposure time duration and a pixel resolution range or a derivative thereof, the maximal velocity threshold representing a velocity required for traversing the pixel resolution range or a derivative thereof in the exposure time duration.

(ii). wherein the camera control unit is configured for adapting the movement velocity of the camera to be in the second range, to:
determine an offset range between consecutive images; accelerate the camera movement along a first portion of the offset range; and decelerate the camera movement along a second portion of the offset range.

(iii). wherein the camera control unit is configured for determining the offset range to: calculate an FOV based on the pixel resolution range and a sensor pixel resolution; and subtract from the FOV an image overlap range between consecutive images.

(iv). wherein the first range and the second range are equal portions of the offset range.

(v). wherein the camera system comprises or is operatively connected to an altimeter and is configured to determine angular maximal velocity threshold value based on linear velocity value and a range value obtained from the altimeter.

(vi). wherein the derivative value is greater than 0 and smaller than 1.

(vii). wherein the camera system is mounted onboard an aircraft.

(viii). wherein the camera control unit is configured to control the supporting device to move the camera along the scanning line extending substantially perpendicular to the direction of flight of the aircraft.

(ix). wherein the camera system is mounted on an unmanned aerial vehicle.

(x). wherein the supporting device is a gimbal assembly comprising one or more gimbals, each gimbal is connected to a gimbal actuator configured to move the gimbal around a respective axis.

According to another aspect of the presently disclosed subject matter there is provided a method of operating a camera system for aerial photography, the camera system comprising a camera control unit operatively connected to a supporting device and camera; the supporting device is connected to the camera and is configured to mechanically support the camera and to move the camera in one or more spinning axes in order to move the camera in a desired direction; the method comprising using the camera control unit for:
controlling the supporting device to move the camera along a scanning line;
controlling the camera to capture images in a certain frame rate as the camera is being moved along the scanning line;
controlling the supporting device to adapt to the velocity at which the camera is being moved according to the current operational mode of the camera; wherein in exposure mode the velocity is adapted to be within a first range selected to reduce camera motion blur; and wherein, in a non-exposure mode, the velocity is adapted to be within a second range which is different than the first range.

According to another aspect of the presently disclosed subject matter there is provided a computer program product implemented on a non-transitory computer useable medium having computer readable program code embodied therein for operating a camera system for aerial photography, the camera system comprising a camera control unit operatively connected to a supporting device and camera; the supporting device is connected to the camera and is configured to mechanically support the camera and to move the camera in one or more spinning axes in order to move the camera in a desired direction; the computer program product comprising:

computer readable program code for causing the computer to control the supporting device to move the camera along a scanning line;
computer readable program code for causing the computer to control the camera to capture images in a certain frame rate as the camera is being moved along the scanning line;
computer readable program code for causing the computer to control the supporting device to adapt the velocity in which the camera is being moved according to the current operational mode of the camera; wherein in exposure mode the velocity is adapted to be within a first range selected to reduce camera motion blur; and wherein in a non-exposure mode the velocity is adapted to be within a second range which is different than the first range.

The method, the computer program product, disclosed in accordance with the presently disclosed subject matter can optionally comprise one or more of features (i) to (x) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
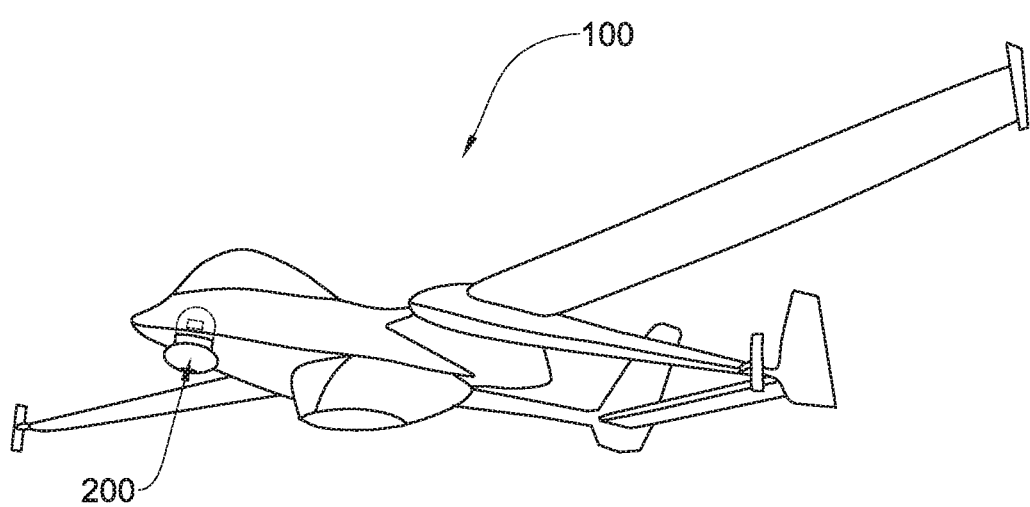
FIG. 1a is a schematic illustration of a UAV with an attached camera system.

In the drawings and descriptions set forth, identical reference numerals indicate those components that are common to different embodiments or configurations. Elements in the drawings are not necessarily drawn to scale.

Unless specifically stated otherwise, as apparent from the following discussions, it is appreciated that throughout the specification discussions utilizing terms such as "controlling", "calculating", "determining", "adapting" or the like, include action and/or processes of a computer that manipulate and/or transform data into other data, said data represented as physical quantities, e.g. such as electronic quantities, and/or said data representing the physical objects.

The terms "computer", "computerized device" or the like, should be expansively construed to cover any kind of electronic device with data processing capabilities, including, by way of non-limiting example, a computer processor (e.g. digital signal processor (DSP), a microcontroller, a field programmable gate array (FPGA), an application specific integrated circuit (ASIC), etc.), or a device comprising one or more computer processors such as a personal computer device, a server device, a computing system, a communication device, any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1B:
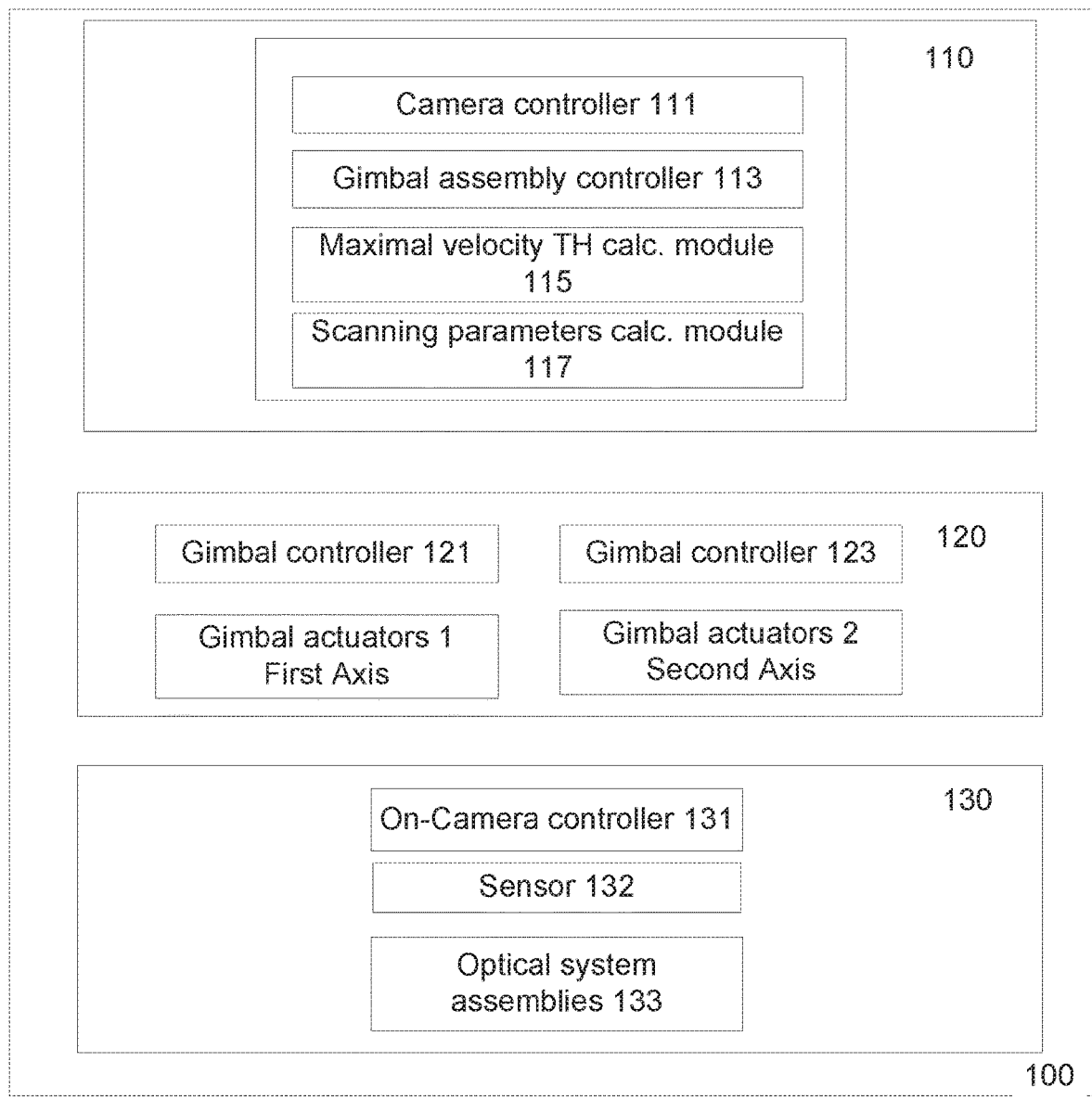
FIG. 1b is a functional block diagram of a camera system, in accordance with an example of the presently disclosed subject matter.
Figure 3:
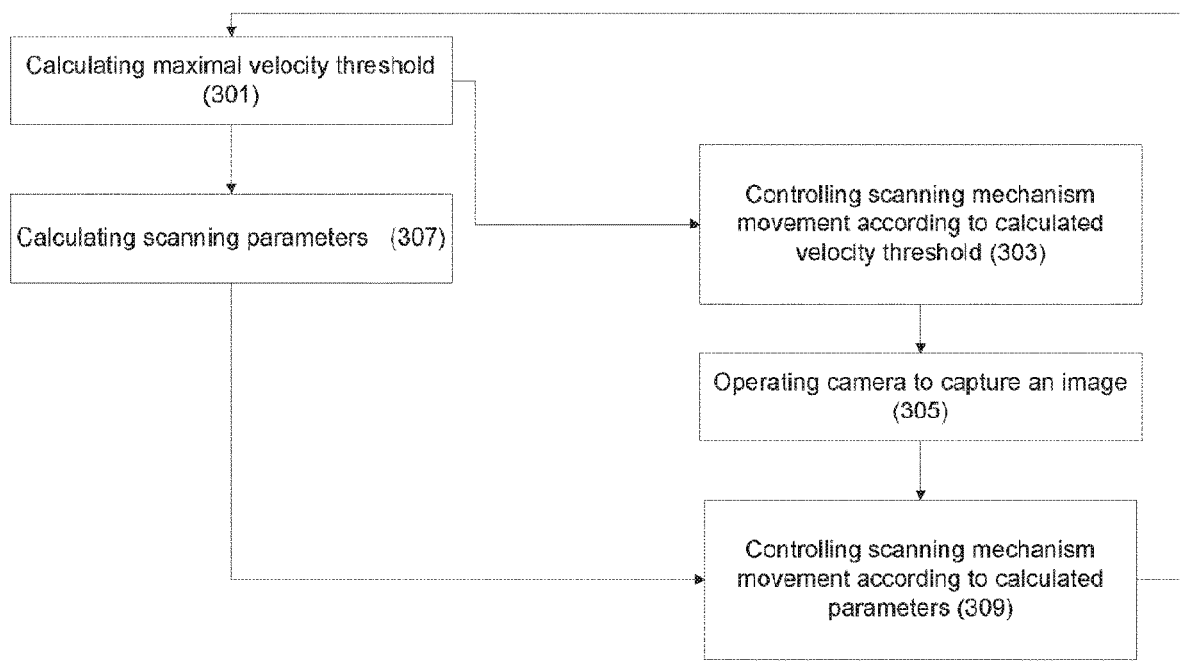
FIG. 3 is a flowchart illustrating operations performed during an aerial photography mission, in accordance with an example of the presently disclosed subject matter.
Figure 4:
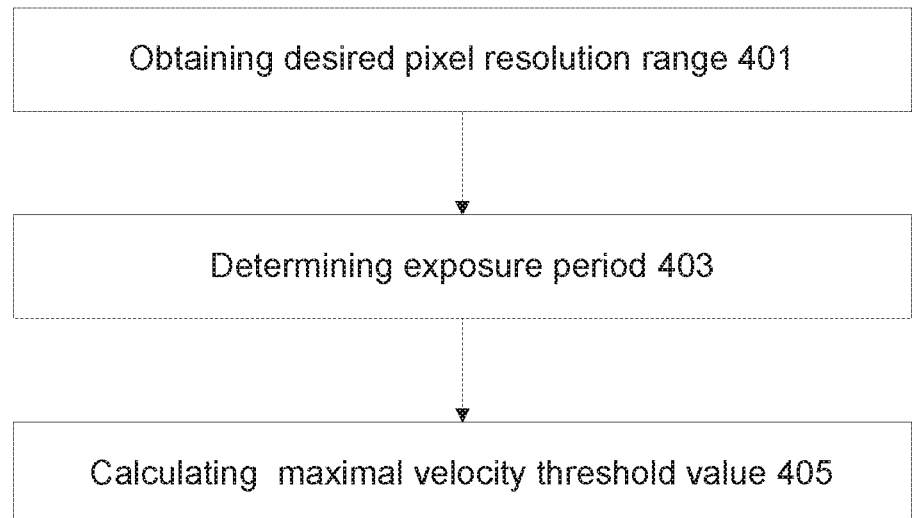
FIG. 4 is a flowchart illustrating operations performed in accordance with an example of the presently disclosed subject matter.
Figure 5:
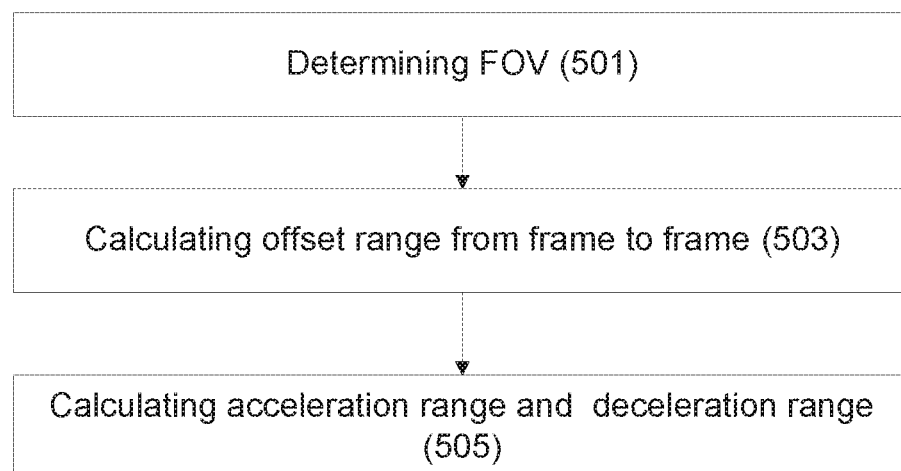
FIG. 5 is another flowchart illustrating operations performed in accordance with an example of the presently disclosed subject matter.

In embodiments of the presently disclosed subject matter, fewer, more and/or different stages than those shown in FIGS. 3, 4, and 5 may be executed. In embodiments of the presently disclosed subject matter one or more stages illustrated in FIGS. 3, 4, and 5 may be executed in a different order and/or one or more groups of stages may be executed simultaneously. FIG. 1b illustrates a general schematic of the system architecture in accordance with an embodiment of the presently disclosed subject matter. Elements in FIG. 1b can be made up of any combination of software and hardware and/or firmware that performs the functions as defined and explained herein. Elements in FIG. 1b may be centralized in one location or dispersed over more than one location. In other embodiments of the presently disclosed subject matter, the system may comprise fewer, more, and/or different elements than those shown in FIG. 1b.

Attention is now drawn to FIG. 1b showing a functional block diagram of a camera system, in accordance with the presently disclosed subject matter. Camera system 100 comprises camera control unit 110, camera supporting device 120 and imaging device (referred herein also as "camera") 130. The camera control unit 110 is operatively connected to the supporting device (e.g. gimbal assembly) 120 and the imaging device 130 and is configured to control their operation.

In general, camera control unit 110 is a computerized device comprising or otherwise operatively connected to one or more computer processors for executing operations and controlling the operation of other units as disclosed herein. According to one example, camera control unit 110 can be configured as part of an onboard computer installed on an aircraft. Alternatively, according to another example, camera control unit 110 can be configured as a designated processing unit directly connected to and/or integrated within the gimbal assembly and/or the imaging device. As mentioned above, the gimbal assembly is connected to the aircraft and provides mechanical support to the camera. According to the illustrated example, camera control unit 110 comprises camera controller 111 and gimbal assembly controller 113.

Camera controller 111 is configured to generate instructions for controlling the operation of the camera. Instructions generated by camera controller 111 can be transmitted for example to on-camera controller 131 located in camera 130, which is configured to control the operation of various camera components including, for example, the shutter for capturing images and camera optical system assemblies (e.g. zoom mechanism, shutter velocity and aperture stop adjustment mechanism).

Gimbal assembly controller 113 is configured to generate instructions for controlling the gimbal assembly. Gimbal assembly 120 can comprise for example, one or more gimbals. Each gimbal provides a respective degree of freedom. Each gimbal is connected to a respective motor (e.g. gimbal actuator 1 and gimbal actuator 2) which is configured to move the gimbal about a respective spin axis, in response to instructions received from a respective gimbal controller (gimbal controller 121 and gimbal controller 123). Instructions generated by gimbal assembly controller 113 are directed for controlling both direction and velocity of the gimbal movement in order to move the camera in a desired direction and velocity to achieve a desired camera movement.

Camera control unit 110 can further comprise maximal velocity threshold calculation module 115 configured to calculate a maximal velocity threshold value as explained below; and scanning parameters calculation module 117 configured to calculate scanning parameters (including acceleration range and deceleration range) as further explained below.

Figure 2:
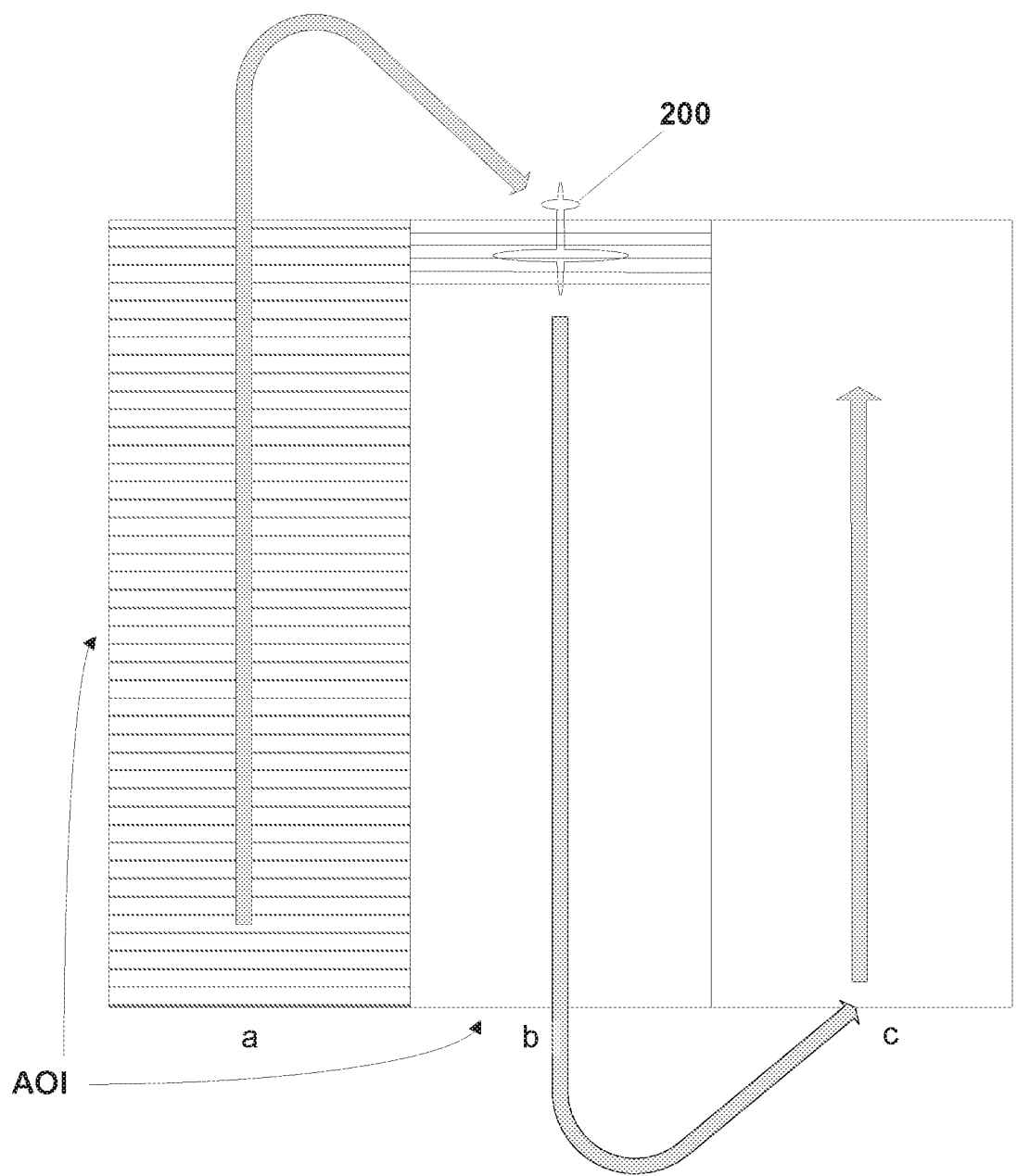
FIG. 2 is a schematic illustration showing in top view the flight progress of an aircraft during an aerial photography mission, in accordance with an example of the presently disclosed subject matter.

Proceeding to FIG. 2 it shows a schematic illustration in top view of flight progress of an aircraft during an aerial photography mission. According to the illustrated example, the area of interest (delineated by the large rectangle AOI) is divided into sections, in the current example 3 sections, a, b, and c. The arrows illustrated along the sections indicate the flight path of the aircraft during a mission. As the aircraft passes over each section, the camera system onboard the aircraft is operated to capture images of the area beneath the aircraft. During each pass, the camera system moves the camera along a scanning line from side to side. Horizontal lines in section 'a' and the beginning of section 'b' represent scanning lines. In the illustrated example aircraft 200 has finished the pass over section 'a' and is now in the initial part of the pass over section 'b'. Although not shown in FIG. 2, in some cases some overlap may exist between two adjacent sections and between consecutive scanning lines. Camera movement can be done for example, along a line located in front part of the aircraft (with an angle of several degrees for gimbal perpendicular protection), or aside it—starting the scan near the aircraft, scanning away towards one side, and scanning back toward the aircraft.

Camera system 100 is configured to continuously control the velocity at which the camera is being moved along each scanning line. According to the presently disclosed subject matter, camera control unit 110 is configured to maintain the camera in continuous movement along each scanning line and adapt the camera movement velocity to the current operational mode of the camera. When the camera is in a first operational mode i.e. the camera is being moved while capturing an image (referred to herein also as "exposure mode"), the camera movement velocity is maintained within one range of values; when the camera is in a second operational mode i.e. the camera is being moved and is not capturing an image (referred to herein also as "non-exposure mode"), the camera movement velocity is maintained within another range of values.

The camera frame rate (frame per second) is selected in order to obtain images which fully cover the entire area along each scanning line. Frame rate can be related to the current FOV. The larger the FOV, the smaller the needed frame rate for covering a given area. The frame rate may be adapted to provide an overlapping range between consecutive images. The scanning line therefore includes a series of points (referred to herein as "exposure points") where the camera is positioned and operates in exposure mode to capture an image. The exposure points are separated by gaps whose range depends on the camera frame rate. During the non-exposure mode the camera is moved from its current position, to the next exposure point where the next image is captured.

FIG. 3 is a flowchart illustrating operations performed during an aerial photography mission, in accordance with an example of the presently disclosed subject matter. Operations described with reference to FIG. 3 as well as FIGS. 4, and 5 below, can be executed, for example, with the help of a camera system configured according to the principles of system 100 described above with reference to FIG. 1b. It is noted however that any description of operations which is made with reference to elements in FIG. 1b is done by way of example and for the purpose of illustration only and should not be construed as limiting in any way.

In general the operations of the camera control unit include operating the gimbal assembly for moving the camera along the scanning line, controlling the camera shutter to capture images in a desired frame rate, and adapting the moving velocity of the camera to the current operation mode of the camera.

As mentioned above, the camera is being constantly moved along a scanning line. Instructions for directing the camera movement along the scanning line are generated (e.g. by camera control unit 110) and provided to the supporting device.

At block 301 a maximal velocity threshold is calculated. The maximal velocity threshold defines the maximal velocity at which the camera can be moved while operating in exposure mode. As explained in more detail below, with reference to FIG. 4, the maximal velocity threshold is determined based on a desired pixel resolution range and the exposure duration.

Assuming that the initial position of the camera is at an exposure point, the velocity at which the camera is moved when operating in exposure mode is controlled not to exceed the maximal velocity threshed (block 303). For example, camera control unit 110 generates instructions to gimbal assembly 120 to move the camera along a scanning line while ensuring that the camera movement velocity does not exceed the calculated threshold.

During the exposure period, the camera is operated to capture one or more images (block 305). This can be accomplished for example by camera control unit 110.

The camera switches from exposure mode to non-exposure mode. In non-exposure mode the camera is moved along an offset range which is the distance between the current position of the camera, at the end of the exposure mode, to the next exposure point where the next image is captured. It is desirable to move the camera along the offset range to the next exposure point as fast as possible. To this end, during the non-exposure mode the camera is moved according to scanning parameters which enable to move the camera quickly to the next exposure point and bring the camera to the next exposure point at a velocity which is equal to or greater than the maximal velocity threshold.

At block 307 scanning parameters are calculated (e.g. by camera control unit 110). The scanning parameters include an acceleration range and deceleration range dividing the offset range. At block 309 the camera is moved along the offset range according to the scanning parameters. The camera is accelerated along the acceleration range and then decelerated along the deceleration range, which terminates at the next exposure point. For example, camera control unit 110 can generate and provide instructions to gimbal assembly for controlling the camera movement along the offset range according to the scanning parameters. Operations related to the calculation of scanning parameters are described in more detail with reference to FIG. 5 below.

FIG. 4 is a flowchart illustrating operations performed by camera system 100 for determining maximal velocity threshold, in accordance with an example of the presently disclosed subject matter. Operations described with reference to FIG. 4 can be executed for example by maximal velocity threshold calculation module 315 in control unit 110.

At block 401 information pertaining to a desired pixel resolution range is obtained. The desired pixel resolution range value can be received for example by a human operator or can be pre-stored in data storage unit operatively connected to camera system 100. The pixel resolution range value defines the desired range on the ground which should project on each pixel in the camera (i.e. the ground surface covered by each pixel).

At block 403 the duration of the exposure period (referred to herein also as "exposure time duration") is determined. In different aerial photography missions the f-stop number is maintained constant during operation. Furthermore the f-stop value is sometimes set to the lowest f-number to provide the largest possible aperture. In such cases, the exposure period is largely determined based on the required light intensity needed for capturing the images. Light intensity can be determined for example by camera control unit 110 or camera 130 (e.g. with the help of a light meter). Notably, as the light intensity can change from one frame to the next, and the duration of the exposure time changes accordingly, the maximal velocity threshold is calculated repeatedly in order to adapt to any changes in light intensity. In some examples, maximal velocity threshold is calculated before each exposure period in order to adapt the maximal velocity threshold during the upcoming exposure period to the current light conditions. In each calculation, the duration of the exposure time is determined, and based on the updated value, the maximal velocity threshold is re-calculated.

At block 405 the maximal velocity threshold is calculated. Given the pixel resolution range and duration of the exposure period, the maximal velocity threshold is determined as a velocity which is equal to or smaller than a velocity which would allow the camera to travel a distance which is equal to the pixel resolution range. Assuming for example the desired pixel resolution range is 0.5 meters per pixel (i.e. 0.5 meters of the ground is projected on each pixel) and the exposure period is 1 millisecond, the maximal velocity threshold is equal to or smaller than 0.5 meters per 1 millisecond or 50 meters per second.

In some examples, a derivative of the desired pixel resolution range is determined and used instead of the pixel resolution range. The derivative is obtained by using a portion of the pixel resolution range as reference. The derivative can be the pixel resolution range multiplied by a number greater than zero and smaller than 1. For example, assuming the desired pixel resolution range is 0.5 meters for each pixel, a derivative image resolution can be 0.25 meters for half a pixel (in which case the maximal velocity threshold would be 25 meters per second). Using a derivative of the pixel resolution range for calculating the maximal can help to improve separation between pixels, and reduce blur.

The angular velocity can be calculated based on a range from the camera to the captured area of interest. The camera system can comprise or be otherwise operatively connected to an altimeter and be configured to determine angular maximal velocity threshold value based on linear velocity value and a range value obtained from the altimeter.

FIG. 5 is a flowchart illustrating operations performed by camera system 100 for calculating scanning parameters, in accordance with an example of the presently disclosed subject matter. Operations described with reference to FIG. 5 can be executed for example by scanning parameters calculation module 317 in control unit 110.

At block 501 field of view (FOV) is determined based on required image resolution and resolution of the sensor of the camera device. Assuming for example that required pixel resolution range is 0.5 and sensor resolution is 500 pixels, the FOV is calculated by 0.5*500=250 meters, which represent the distance on the ground covered by each frame.

At block 503 an offset range from frame to frame is determined. The offset range is the range of new ground covered in each new frame. According to one example, it can be equal to the FOV. According to other examples, in order to enable the successful stitching of the captured images into one combined image there, an overlap is maintained between consecutive frames. The offset range depends on the overlapping range and equals the FOV minus the overlapping range. For example, if the overlapping range is 20% of the FOV and FOV is 250 meters, the overlap range equals 20% of 250 which equals 50 meters. In this case, the offset range equals 250−50=200.

At block 505 the acceleration and deceleration range are calculated. According to one example the offset range is divided into two equal halves, one half being the acceleration range and the other half being the deceleration range.

Returning to block 309 the camera control unit can be configured to generate instructions for moving the camera during the non-exposure period as follows: accelerate the camera movement as fast as possible (possibly while considering technical constraints required for avoiding inflicting damage to the camera) along the acceleration range. Once the acceleration range is traversed and the deceleration range is initiated, the camera control unit controls the gimbal assembly to decelerate the camera movement. Since the acceleration and deceleration are equivalent and opposite vectors quantities and are done along equal distance, at the end of the deceleration range, when the camera reaches the next exposure point, the velocity of the camera is back at the same value as it was before the beginning of acceleration i.e. within the range prescribed by the maximal velocity threshold.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A camera system for aerial photography, the camera system comprising:
a camera control unit operatively connected to a supporting device and camera; the supporting device is connected to the camera and is configured to mechanically support the camera and to move the camera in one or more spinning axes in order to achieve camera movement in a desired direction;
wherein the camera control unit is configured to:
control the supporting device to move the camera along a scanning line; and
control the camera to capture images in a certain frame rate as the camera is being moved along the scanning line;
wherein the camera control unit is further configured to control the supporting device to adapt to a velocity at which the camera is being moved according to a current operational mode of the camera;
wherein, when the camera is in exposure mode, the velocity is adapted to be within a first range, selected to reduce camera motion blur; and
wherein, when the camera is in a non-exposure mode, the velocity is adapted to be within a second range which is different than the first range;
wherein the velocity in the first range and the velocity in the second range are greater than 0 and is equal or smaller than a maximal velocity threshold value, and the velocity in the second range is greater than the velocity in the first range;
wherein the camera control unit is configured to calculate the maximal velocity threshold representing a velocity required for traversing a pixel resolution range or a derivative thereof when operating in exposure mode.

2. The camera system according to claim 1, wherein the camera control unit is configured for adapting the movement velocity of the camera to be in the second range, to:
obtain an offset range between consecutive images;
accelerate the camera movement along a first portion of the offset range; and
decelerate the camera movement along a second portion of the offset range.

3. The camera system according to claim 2 wherein the camera control unit is configured for determining the offset range to: calculate a field of view (FOV) based on the pixel resolution range and a sensor pixel resolution;
and subtract from the FOV an image overlap range between consecutive images.

4. A method of operating a camera system for aerial photography, the camera is connected to the supporting device configured to mechanically support the camera and to move the camera in one or more spinning axes in order to move the camera in a desired direction; the method comprising:
controlling the supporting device to move the camera along a scanning line;
controlling the camera to capture images in a certain frame rate as the camera is being moved along the scanning line;

controlling the supporting device to adapt to a velocity at which the camera is being moved according to a current operational mode of the camera;

wherein, in exposure mode, the velocity is adapted to be within a first range selected to reduce camera motion blur; and wherein, in a non-exposure mode, the velocity is adapted to be within a second range which is different than the first range; wherein the velocity in the first range and the velocity in the second range are greater than 0 and is equal or smaller than a maximal velocity threshold value, and the velocity in the second range is greater than the velocity in the first range; and calculating the maximal velocity threshold representing a velocity required for traversing a pixel resolution range or a derivative thereof when operating in exposure mode.

5. The camera system according to claim 2, wherein the first range and the second range are equal portions of the offset range.

6. The camera system according to claim 1, wherein the camera system comprises or is operatively connected to an altimeter and is configured to determine angular maximal velocity threshold value based on linear velocity value and a range value obtained from the altimeter.

7. The camera system according to claim 1, wherein the derivative has a derivative value that is greater than 0 and smaller than 1.

8. The camera system according to claim 1, wherein when the camera is mounted onboard an aircraft, the camera control unit is configured to control the supporting device to move the camera along the scanning line extending substantially perpendicular to a direction of flight of the aircraft.

9. The camera system according to claim 8, wherein the aircraft is an unmanned aerial vehicle.

10. The camera system according to claim 1, wherein the supporting device includes a gimbal assembly comprising one or more gimbals, each gimbal of the one or more gimbals being connected to a gimbal actuator configured to move the gimbal around a respective axis.

11. The camera system of claim 1, wherein the camera control unit is configured to control the supporting device to move the camera along a scanning line without stopping.

12. The method according to claim 4, wherein the derivative has a derivative value that is greater than 0 and smaller than 1.

13. The method according to claim 4 further comprising adapting the movement velocity of the camera to be in the second range including:

obtaining an offset range between consecutive images;

accelerating the camera movement along a first portion of the offset range; and decelerating the camera movement along a second portion of the offset range.

14. The method according to claim 13 further comprising determining the offset range, including:

calculating a FOV based on the pixel resolution range and a sensor pixel resolution; and subtracting from the FOV an images overlap value to be obtained.

15. The method according to claim 13, wherein the first range and the second range are equal portions of the offset range.

16. The method according to claim 13, wherein the camera system is mounted and operating onboard an aircraft.

17. The method according to claim 16 further comprising: controlling the supporting device to move the camera along the scanning line extending substantially perpendicular to a direction of flight of the aircraft.

18. The method according to claim 16 further comprising: determining an angular maximal velocity threshold value based on a linear velocity value and a range value obtained from an altimeter onboard the aircraft.

19. The method of claim 4, wherein the camera is moved along the scanning line for capturing images, without stopping.

20. A computer program product implemented on a non-transitory computer useable medium having computer readable program code embodied therein for operating a camera system for aerial photography; the camera system comprising a supporting device operatively connected to a camera; the supporting device is configured to mechanically support the camera and to enable movement of the camera in one or more spinning axes in order to move the camera in a desired direction; the computer program product comprising:

computer readable program code for causing a computer to control the supporting device to move the camera along a scanning line;

computer readable program code for causing the computer to control the camera to capture images in a certain frame rate as the camera is being moved along the scanning line; and computer readable program code for causing the computer to control the supporting device to adapt a velocity at which the camera is being moved according to the current operational mode of the camera;

wherein, in exposure mode, the velocity is adapted to be within a first range selected to reduce camera motion blur; and wherein, in a non-exposure mode, the velocity is adapted to be within a second range which is different than the first range wherein the velocity in the first range and the velocity in the second range are greater than 0 and is equal or smaller than a maximal velocity threshold value, and the velocity in the second range is greater than the velocity in the first range; and calculating the maximal velocity threshold representing a velocity required for traversing a pixel resolution range or a derivative thereof when operating in exposure mode.

21. The computer program product of claim 20, wherein the camera is moved along the scanning line for capturing images, without stopping.

* * * * *